(12) United States Patent
Ota et al.

(10) Patent No.: US 7,578,862 B2
(45) Date of Patent: Aug. 25, 2009

(54) ABRASIVE COMPOUND FOR GLASS HARD DISK PLATTER

(75) Inventors: Isao Ota, Sodegaura (JP); Tohru Nishimura, Sodeguara (JP); Kenji Tanimoto, Nei-gun (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 20 days.

(21) Appl. No.: 10/678,093

(22) Filed: Oct. 6, 2003

(65) Prior Publication Data

US 2004/0065023 A1 Apr. 8, 2004

Related U.S. Application Data

(63) Continuation of application No. 09/980,685, filed as application No. PCT/JP00/04172 on Jun. 26, 2000, now abandoned.

(30) Foreign Application Priority Data

Jun. 28, 1999 (JP) ................... 11-181449

(51) Int. Cl.
*C09K 3/14* (2006.01)
*C03C 19/00* (2006.01)
*B24B 37/00* (2006.01)

(52) U.S. Cl. .............. 51/307; 51/308; 216/97; 106/3; 510/180; 510/181

(58) Field of Classification Search .......... 51/307–309; 106/3; 451/28, 36, 41, 57, 26; 216/97; 510/180–181
See application file for complete search history.

(56) References Cited

U.S. PATENT DOCUMENTS

| | | | |
|---|---|---|---|
| 4,942,697 A * | 7/1990 | Khaladji et al. ............... 51/309 |
| 5,543,126 A | 8/1996 | Ota et al. | |
| 5,772,780 A | 6/1998 | Homma et al. | |
| 5,783,489 A | 7/1998 | Kaufman et al. | |
| 5,962,343 A * | 10/1999 | Kasai et al. ................. 438/693 |
| 6,120,571 A | 9/2000 | Aihara et al. | |
| 6,221,118 B1 | 4/2001 | Yoshida et al. | |
| 6,343,976 B1 | 2/2002 | Yoshida et al. | |
| 6,372,003 B1 | 4/2002 | Kasai et al. | |
| 6,420,269 B2 | 7/2002 | Matsuzawa et al. | |
| 6,454,821 B1 | 9/2002 | Abbasi et al. | |
| 6,478,836 B1 | 11/2002 | Kido et al. | |

FOREIGN PATENT DOCUMENTS

| | | |
|---|---|---|
| EP | 0 822 164 A2 | 2/1998 |
| EP | 0 875 547 A2 | 11/1998 |
| JP | A 5-326469 | 12/1993 |
| JP | A 8-3541 | 1/1996 |
| JP | A-08-003541 | 1/1996 |
| JP | A 8-134435 | 5/1996 |
| JP | A-08-134435 | 5/1996 |
| JP | A 9-142840 | 6/1997 |
| JP | A-10-152673 | 6/1998 |
| JP | B2 2864451 | 12/1998 |
| JP | A 11-60282 | 3/1999 |
| JP | A 2000-38572 | 2/2000 |
| WO | WO 98/21289 | 5/1998 |
| WO | WO 99/31195 | 6/1999 |

* cited by examiner

*Primary Examiner*—Michael A Marcheschi
(74) *Attorney, Agent, or Firm*—Oliff & Berridge, PLC

(57) ABSTRACT

The present invention provides an abrasive compound suitable for polishing the surface of a glass substrate for an optical disk platter or a magnetic disk platter. More specifically, the present invention provides an abrasive compound for a glass hard disk platter, characterized as comprising a stable slurry having water and, dispersed therein as an abrasive, cerium (IV) oxide particles having an average secondary particle size of 0.1 to 0.5 μm and containing $CeO_2$ in a concentration of 0.2 to 30 wt %. Preferably, the present invention provides the above abrasive compound in which cerium amounts for 95% or more in terms of oxides of the total amount of rare earth elements in the abrasive.

4 Claims, No Drawings

# ABRASIVE COMPOUND FOR GLASS HARD DISK PLATTER

This is a Continuation of application Ser. No. 09/980,685 filed Dec. 7, 2001, now abandoned, which in turn is a National Stage of PCT/JP00/04172 filed Jun. 26, 2000. The entire disclosure of the prior applications is hereby incorporated by reference herein in its entirety.

TECHNICAL FIELD

The present invention relates to an abrasive compound suitable for polishing the surface of a glass substrate for an optical disk platter and a magnetic disk platter.

BACKGROUND ART

Abrasive compounds for a glass substrate for an optical disk platter and a magnetic disk platter is an aqueous dispersion of abrasive grain containing cerium oxide obtained by calcinating and dry milling bastnaesite ore or rare earth chloride. The abrasive grain is relatively inexpensive. However, its cerium oxide content is at most 50 to 90% and it is difficult to increase the purity any more since natural ore is used as a raw material. The average secondary particle size of the powder is 1 to 3 µm. It is difficult to decrease the average secondary particle size to 1 µm or less when the powder is made finer by a breakdown method such as dry milling.

Regarding the abrasive compound for $SiO_2$ oxide film of a semiconductor device, Japanese Patent Application Laid-open No. Hei 5-326469 discloses an abrasive compound comprising cerium oxide having an average particle size of 1 µm or less and a cerium oxide purity of 99.5% or more. Japanese Patent No. 2864451 discloses that polishing with an abrasive compound having an average particle size of 0.1 µm or less and a cerium oxide purity of 99.5% or more gives rise to an oxide film of high quality.

On the other hand, in polishing a glass substrate for an optical disk platter and a magnetic disk platter, Japanese Patent Application Laid-open No. Hei 11-60282 discloses a method for polishing a glass substrate for a magnetic disk platter in which the cerium oxide content in an abrasive liquid is set to 0.5 to 8 wt %. International Publication No. WO98/21289 discloses a method for using an abrasive material having an average particle size of primary particle is 0.002 to 3 µm in an abrasive composition for a substrate for a magnetic recording medium comprising an abrasive compound, an abrasive auxiliary compound and water.

In recent years, the performance of a glass substrate for an optical disk platter and a magnetic disk platter tends to be higher in density and speed and therefore a polished surface of high quality having smaller surface roughness and average waviness is desired. However, it becomes increasingly difficult to obtain a good polished surface by use of cerium(IV) oxide abrasive grains having a cerium oxide purity of 50 to 90% and an average secondary particle size of 1 to 3 µm obtained by calcinating and dry milling bastnaesite ore or rare earth chloride.

It has been found out that in order to solve the problems, a abrasive compound for a glass substrate for an optical disk platter or a magnetic disk platter that can give a polished surface of high quality and that allows high speed polishing can be obtained by setting an average secondary particle size of cerium(IV) oxide particles to 1 µm or less and increasing the cerium amount for 95% or more in terms of oxide of the total amount of rare earth elements in the abrasive in order to supplement a decrease in polishing speed as a result of a reduction in the average secondary particle size of cerium(IV) oxide particle. The present invention has been achieved based on this discovery.

DISCLOSURE OF THE INVENTION

In a first aspect, the present invention provides an abrasive compound for glass hard disk platter, characterized as comprising a stable slurry having water and, dispersed therein as an abrasive, cerium(IV) oxide particles having an average secondary particle size of 0.1 to 0.5 µm and containing $CeO_2$ in a concentration of 0.2 to 30 wt %.

Further, in a second aspect, the present invention provides an abrasive compound for glass hard disk platter according to the first aspect, characterized in that cerium amounts for 95% or more in terms of oxides of the total amount of rare earth elements in the abrasive.

The cerium(IV) oxide particles are crystalline cerium(IV) oxide particles having an average secondary particle size of 0.1 to 0.5 µm, preferably 0.2 to 0.3 µm.

Here, the term "average secondary particle size" is defined as follows. A sol in which particles are dispersed as single particles or in a state close thereto is referred to as a primary sol. A particle in the primary sol is referred to as a primary particle. An aggregate of the some primary particles in the primary sol is a secondary sol and respective aggregate are referred to as secondary particles. Here, a particle size that corresponds to 50% of an accumulated particle size distribution of the secondary particle, that is, a particle size expressed as a median size is referred to as an average secondary particle size. An secondary particle size can be measured by use of a commercially available centrifugal particle size distribution measuring apparatus, for example, CAPA-700, trade name for a product of Horiba Seisakusho Co., Ltd.

In the present invention, preferably, cerium amounts for 95% or more in terms of oxides of the total amount of rare earth elements in the abrasive. This amount may be expressed as a ratio of (cerium oxide)/(cerium oxide+other rare earth oxides) in the cerium(IV) oxide particle.

As the cerium(IV) oxide particle may be used cerium(IV) oxide particle produced by a known method.

Particularly preferable cerium(IV) oxide particle is a crystalline cerium(IV) oxide particle having an average secondary particle size of 0.1 to 0.5 µm (micron) produced by a first production method, i.e., a method in which: a cerium (III) salt are reacted with an alkaline substance in a $(OH)/(Ce^{3+})$ molar ratio of 3 to 30 in an aqueous medium under an inert gas atmosphere to form a suspension of cerium (III) hydroxide; and immediately thereafter oxygen or a gas containing oxygen is blown into the resulting suspension at atmospheric pressure at a temperature of 10 to 95° C.

In the first production method for the cerium(IV) oxide particles, as a first step, a cerium (III) salt are reacted with an alkaline substance in a $(OH)/(Ce^{3+})$ molar ratio of 3 to 30 in an aqueous medium under an inert gas atmosphere to form a suspension of cerium (III) hydroxide, i.e., cerous hydroxide.

The reaction under an inert gas atmosphere is, for example, a reaction with a cerium (III) salt and an alkaline substance in an aqueous medium by use of a reactor that allows for gas substitution, equipped with a stirrer and a thermometer. As the aqueous medium, water is usually used. A small amount of water-soluble organic solvent may be contained. The gas substitution is performed as follows. That is, a gas inlet port in the form of a thin tube is submerged in an aqueous medium, an inert gas is blown into the aqueous medium and the gas is discharged through a discharge port attached to an upper part of the aqueous medium in the reactor to fill the inert gas in the reactor. The reaction is started preferably after completion of the inert gas substitution. The reactor may be made of a material such as stainless steel, glass lining or the like. In this case, the inside of the reactor is desirably at an atmospheric pressure. Therefore, it is preferred that the input amount and output amount of gas are substantially identical. Preferably, the input and output amounts of gas are each 0.01 to 20 liters/minute per liter of the volume of the reactor.

The inert gas includes nitrogen gas, argon gas and so forth. In particular, nitrogen gas is preferred.

In the first production method, the cerium (III) salt used includes, for example, cerous nitrate, cerous chloride, cerous sulfate, cerous carbonate, cerium (III) ammonium nitrate and so forth. The cerium (III) salt may be used alone or as mixtures.

In the first production method, the alkaline substance used includes alkaline metal hydroxides such as sodium hydroxide and potassium hydroxide, organic bases such as ammonia, amines and quaternary ammonium hydroxide salts. In particular, ammonia, sodium hydroxide, and potassium hydroxide are preferred. These may be used alone or as mixtures.

The cerium (III) salt and alkaline substance may be reacted by adding them into a reactor. Alternatively, the reaction may be performed by preparing an aqueous cerium (III) salt solution and an aqueous alkaline substance solution, and mixing the both aqueous solutions with each other. The cerium (III) salt is used in a concentration of preferably 1 to 50 wt % in an aqueous medium.

In the first production method above, the ratio between the cerium (III) salt and the alkaline substance is 3 to 30, preferably 6 to 12, in terms of $(OH)/(Ce^{3+})$ molar ratio. A $(OH)/(Ce^{3+})$ molar ratio of less than 3 is undesirable since the cerium (III) salt is not completely neutralized into cerium (III) hydroxide and a part of the cerium (III) salt remains in the suspension. This is because the cerium (III) salt has an oxidation reaction rate into cerium (IV) is very low as compared with the oxidation reaction rate into cerium (III) hydroxide, so that when cerium (III) hydroxide and cerium (III) salt coexist, it is difficult to control nucleation rate and crystal growth rate of crystalline cerium(IV) oxide, as a result, the particle size distribution is broad and the particle size is not uniform. On the other hand, a $(OH)/(Ce^{3+})$ molar ratio of more than 30 is undesirable since the crystallinity of the obtained crystalline cerium(IV) oxide particle decreases, and when in use as an abrasive compound, a decrease in polishing speed occurs. Furthermore, the particle size distribution of the particles is broad and the particle size is not uniform.

In the first production method above, the reaction time of the first step may vary depending on the charge amount, but generally is 1 minute to 24 hours.

In the first step above, the cerium (III) salt and alkaline substance can be reacted in a gas containing oxygen such as air in place of the inert gas. However, the produced cerium (III) hydroxide contacts oxygen and is converted into cerium (IV) salt or cerium(IV) oxide so that a large number of nuclei of cerium(IV) oxide are generated in an aqueous medium. As a result, the obtained cerium(IV) oxide particles have a broad particle size distribution and the particle size is not uniform.

Next, in a second step, oxygen or a gas containing oxygen is blown into the suspension obtained in the first step under atmospheric pressure at a temperature of 10 to 95° C. to produce crystalline cerium(IV) oxide particles having an average secondary particle size of 0.1 to 0.5 μm. That is, the second step is a step where the cerium (III) hydroxide in the suspension obtained in the first step is treated in the presence of oxygen or a gas containing oxygen to produce cerium(IV) oxide particles having high crystallinity. The oxygen or gas containing oxygen includes gaseous oxygen or air, and mixed gases of oxygen and an inert gas. The inert gas includes nitrogen, argon and so forth. When using a mixed gas, the oxygen content thereof is preferably 1% by volume or more. In the second step, it is particularly preferable to use air in consideration of ease of production.

The second step is subsequently carried out in the same reactor as used in the first step. Following the introduction of the inert gas in the first step, a gas is continuously introduced by immediately substituting oxygen or a gas containing oxygen for the inert gas. That is, oxygen or a gas containing oxygen is blown into the suspension obtained in the first step through a gas inlet port in the form of a thin tube submerged in the suspension.

Since the second step is carried out at atmospheric pressure, substantially the same amount of gas as that of the gas introduced into the suspension is discharged through the discharge port attached to the upper part of the suspension in the reactor.

In the second step, the total amount of oxygen or gas containing oxygen blown into the suspension is an amount such that cerium (III) hydroxide can be converted into cerium (IV) oxide and is preferably 1 or more in terms of $(O_2)/(Ce^{3+})$ molar ratio. If the above molar ratio is less than 1, cerium (III) hydroxide remains in the suspension, which contacts oxygen in the air during washing after completion of the second step, with the result that fine particles may be produced. Therefore, the obtained cerium(IV) oxide particles have a broad particle size distribution and the particle size is not uniform.

In the second step, preferably input and output amounts per unit time of gas are each 0.01 to 50 liters/minute per liter of the volume of the reactor.

In the case where the blowing of an inert gas in the first step and the blowing of oxygen or gas containing oxygen in the second step are not continuous in time, the surface of the suspension obtained in the first step contacts oxygen, so that a layer containing cerium(IV) oxide particles with different particle sizes is formed on the surface layer. As a result, the particle size of the cerium(IV) oxide particles obtained in the second step subsequently performed is not uniform.

Preferably, the second step is performed with stirring the suspension with a stirrer such as disper so that oxygen or gas containing oxygen can be present uniformly in the suspension. In the case where the blowing of gas stirs the suspension itself, stirring with a stirrer is not always necessary.

Production of crystalline cerium(IV) oxide particles by oxidation of cerium (III) hydroxide in the first production method above means that nucleation and crystal growth of crystalline cerium(IV) oxide particles are performed. In this case, the nucleation rate and crystal growth rate can be controlled by the concentration of a cerium salt, concentration of an alkaline substance, reaction temperature, concentration of an oxidative aqueous solution, and feed amounts and so forth. In the above method, the concentration of a cerium salt, concentration of an alkaline substance, reaction temperature, concentration of an oxidative aqueous solution, and feed amounts and so forth upon the nucleation and crystal growth may be optionally varied. By adjusting these factors, the particle size can be optionally controlled within the ranges of 0.1 to 0.5 μm in terms of an average secondary particle size.

The cerium(IV) oxide particles obtained in the first production method for the above-mentioned particles can be taken out of the reactor as a slurry, which may be washed with an ultrafiltration method or a filter press washing method to remove impurities. A abrasive liquid can be obtained by dispersing the obtained particles in an aqueous medium.

The cerium(IV) oxide particles used in the present invention may be crystalline cerium(IV) oxide particles having an average secondary particle size of 0.1 to 0.5 μm, which are produced by a second production method that is a preferred method, in which a cerium (III) salt and an alkaline substance are reacted in a $(OH)/(Ce^{3+})$ molar ratio of 3 to 30 in an open air to produce a suspension of cerium hydroxide and immediately thereafter oxygen or gas containing oxygen is blown into the resulting suspension at an atmospheric pressure at a temperature of 10 to 95° C.

That is, the second production method for cerium(IV) oxide particles includes a first step in which a cerium (III) salt and an alkaline substance are reacted in a $(OH)/(Ce^{3+})$ molar ratio of 3 to 30 in an open air to produce a suspension of cerium hydroxide and a second step in which oxygen or gas containing oxygen is blown into the resulting suspension at an atmospheric pressure at a temperature of 10 to 95° C., thereby producing crystalline cerium(IV) oxide particles having an average secondary particle size of 0.1 to 0.5 μm.

Other conditions and raw materials used in the second production method are the same as those in the first production method.

In the second production method, if the neutralization of the cerium (III) salt and alkaline substance is performed in an open air without using the inert gas, the produced cerium (III) hydroxide contacts oxygen and is gradually converted into cerium (IV) salt or cerium(IV) oxide, so that nuclei of cerium (IV) oxide are generated in the aqueous medium. In the next step, when the cerium (III) salt and the alkaline substance are reacted in a gas containing oxygen such as air after elevating the temperature to a predetermined temperature, the produced cerium (III) hydroxide contacts oxygen and is successively converted into cerium (IV) salt or cerium(IV) oxide, so that the particle size distribution of the cerium(IV) oxide particles is broad and the particle size is not uniform as compared with that of the cerium(IV) oxide particles obtained in the first production method. However, the cerium (IV) oxide particles obtained by the second production method are also useful since they can provide high quality polished surfaces when used as an abrasive compound for a glass hard disk platter.

After drying at 110° C., the cerium(IV) oxide particles obtained by the above particle production method was measured of diffraction pattern with an X-ray diffraction apparatus, and it revealed that the particles are highly crystalline cerium(IV) oxide particles of cubic crystal form having a diffraction pattern with main peaks at diffraction angles $2\theta=28.6°, 47.5°$ and $56.4°$ and described in ASTM Card No. 34-394. The specific surface area of the cerium(IV) oxide particles by a gas adsorption method (BET method) is 2 to 200 $m^2/g$.

The cerium(IV) oxide particles obtained by these methods are formulated into an abrasive compound dispersed in purified water. Besides, they may be formulated into an abrasive compound by heat-treating them at a temperature of 50 to 250° C. in an aqueous medium in the presence of an ammonium salt.

As the above-mentioned aqueous medium, water is usually used. However, a small amount of a water-soluble organic medium may be contained therein.

The ammonium salt used in the above may be ammonium salts whose anionic component is a non-oxidative component. The ammonium salt having a non-oxidative anionic component includes most preferably ammonium carbonate or ammonium hydrogen carbonate. These may be used alone or as mixtures.

The ammonium salt having a non-oxidative anionic component as described above preferably has a $[NH_4^+]/[CeO_2]$ molar ratio in an aqueous medium of 0.1 to 30 and also it is preferred that the concentration of the ammonium salt in an aqueous medium be 1 to 30 wt %.

In the case where an ammonium salt having an anionic component as a non-oxidative component is heated in an aqueous medium, heat treatment at a temperature of 50 to 250° C., preferably 50 to 180°0 C., can give crystalline cerium(IV) oxide particles with modified surface. The heating time may be set to 10 minutes to 48 hours. If the temperature of heat treatment is 100° C. or less, an open system reactor is used for the treatment while at a temperature above 100° C., the treatment is carried out by use of an autoclave apparatus or a supercritical treatment apparatus. The heat treated cerium (IV) oxide particles may be taken out of the treatment tank as a slurry and washed by an ultrafiltration method or a filter press method to remove impurities.

The cerium(IV) oxide particles which are thus heat treated in the presence of the ammonium salt having a non-oxidative anionic component and have undergone surface modification can be readily dispersed in an aqueous medium to form an abrasive liquid. It is preferred to use water as the aqueous medium.

It is preferred to add a quaternary ammonium ion ($NR_4^+$, where R is an organic group) in a $(NR_4^+)/(CeO_2)$ molar ratio in the range of 0.001 to 1 to the sol, which contains cerium (IV) oxide particles the surface of which has been modified by heat treatment in an aqueous medium in the presence of the ammonium salt having a non-oxidative anionic component, after washing it to remove impurities, since the stability of an abrasive liquid is improved. The quaternary ammonium ion is given by addition of quaternary ammonium silicate, halogenated quaternary ammonium, quaternary ammonium hydroxide or mixtures thereof. In particular, addition of quaternary ammonium silicate or quaternary ammonium hydroxide is preferable.

The organic group R includes a methyl group, an ethyl group, a propyl group, a hydroxyethyl group and a benzyl group and so forth. The quaternary ammonium compounds that provide the quaternary ammonium ions include, for example, tetramethylammonium silicate, tetraethylammonium silicate, tetraethanolammonium silicate, monoethyltriethanolammonium silicate, trimethylbenzylammonium silicate, tetramethylammonium hydroxide and teraethylammonium hydroxide.

The abrasive liquid prepared as described above may contain a small amount of acid or base. The pH of the abrasive liquid is preferably 2 to 12. The abrasive liquid (sol) can be converted into an acidic abrasive liquid (sol) by addition of a water-soluble acid in a $[H^+]/[CeO_2]$ molar ratio in the range of 0.001 to 1. The acidic sol has a pH of 2 to 6. The water-soluble acid includes, for example, inorganic acids such as hydrogen chloride and nitric acid, organic acids such as formic acid, acetic acid, oxalic acid, tartaric acid, citric acid and lactic acid, acidic salts thereof or mixtures thereof. On the contrary, the abrasive liquid of the present invention can be converted into an alkaline sol by addition of a water-soluble base in a $[OH^-]/[CeO_2]$ molar ratio in the range of 0.001 to 1. The alkaline abrasive liquid (sol) has a pH of 8 to 12. The water-soluble base includes, besides the above-described quaternary ammonium silicate and quaternary ammonium hydroxide, amines such as monoethanolamine, diethanolamine, triethanolamine, aminoethylethanolamine, N,N-dimethylethanolamine, N-methylethanolamine, monopropanolamine and morpholine, and ammonia.

In the abrasive liquid of the present invention, the cerium (IV) oxide particles may have mechanical polishing effect and at the same time chemical polishing effect. By conducting heat treatment in an aqueous medium in the presence of an ammonium salt having a non-oxidative anionic component, many hydroxyl groups ($\equiv$Ce—OH) are generated on the surface of the cerium(IV) oxide particles. It is considered that the ($\equiv$Ce—OH) groups have chemical effect on hydroxyl groups ($\equiv$Si—OH) on the surface of silicon oxide film, so that the polishing speed can be improved. Furthermore, it is considered that the ammonium salt having a non-oxidative anionic component may exert reductive effect on the surface of the cerium(IV) oxide particles.

The abrasive compound for a glass substrate for an optical disk platter or a magnetic disk platter according to the present invention is a stable slurry obtained by dispersing in water cerium(IV) oxide particles having an average secondary particle size of 0.1 to 0.5 μm as an abrasive. An average secondary particle size of cerium(IV) oxide particles which is greater than 0.5 μm is undesirable since the surface roughness is too large. On the other hand, an average secondary particle size of cerium(IV) oxide particles which is smaller than 0.1 μm is undesirable since the polishing speed is decreased.

Further, as described above, it is preferable that cerium amounts for 95% or more in terms of oxides of the total amount of rare earth elements in the abrasive. If it amounts for less than 95%, the polishing speed is decreased and the productivity is deteriorated.

Further, it is preferred that $CeO_2$ be contained in a concentration of 0.2 to 30 wt %. If the $CeO_2$ concentration is less than 0.2 wt %, the polishing speed is decreased and the productivity is deteriorated. If the $CeO_2$ concentration is above 30 wt %, the viscosity of slurry increases and the polishing resistance becomes very high.

The abrasive liquid of the present invention is stable after being left standing at room temperature for over 1 year or more.

Further, the advantages of the abrasive of the present invention include abilities of reclamation and reuse. Usually, decreased polishing speed (that is, decreased polishing ability) of abrasives results in a decrease in productivity in the polishing step. Accordingly, such abrasives will be discarded as they are. However, in the present invention, the cerium(IV) oxide particles having a decreased polishing ability after use can be regenerated as an abrasive that has recovered polishing ability and improved polishing speed by heat treatment at a temperature of 50 to 250° C. in an aqueous medium in the presence of an ammonium salt having a non-oxidative anionic component.

The abrasive compound of the present invention as described above is excellent as an abrasive for a glass substrate for an optical disk platter and a magnetic disk platter. The glass substrate for an optical disk platter and a magnetic disk platter includes crystallized glass hard disk, aluminosilicate reinforced glass or soda lime reinforced glass hard disk, etc.

BEST MODE FOR CARRYING OUT THE INVENTION

Example 1

A 100-liter stainless steel reactor was charged with 23.8 kg of aqueous 20% ammonia solution corresponding to $NH_3/Ce^{3+}$=6 (molar ratio) and 1 $Nm^3$/hour of nitrogen gas was blown therein through a glass nozzle while keeping the liquid temperature at 30° C. Then, 76.2 kg of an aqueous cerium (III) nitrate solution containing cerous nitrate in an amount of 99.0% in terms of purity of $CeO_2$ of the total rare earth oxides (containing 8.0 kg in terms of $CeO_2$) was gradually added thereto to obtain a suspension of cerium (III) hydroxide. The temperature of the suspension was then elevated to 80° C. over 1 hour. Thereafter, the gas to be blown through the glass nozzle was switched gas from nitrogen to 2 $Nm^3$/hour of air and the oxidation reaction for converting cerium (III) to cerium (IV) was started. The oxidation reaction was completed in 5 hours. The liquid after the completion of the oxidation reaction was returned to room temperature to obtain a reaction mixture containing pale yellow fine particles at pH=8.7 having an electric conductivity of 83 mS/cm.

The reaction mixture was washed by using of a rotary filter press (manufactured by Kotobuki Giken Co., Ltd.) to obtain a slurry having an electric conductivity of 20 μS/cm and a $CeO_2$ concentration of 22 wt %. The slurry was dispersed in purified water and then the pH of the dispersion was adjusted to 5 with 10% nitric acid to prepare a slurry having a $CeO_2$ concentration of 5 wt %.

The obtained particles were measured for average secondary particle size by using a centrifugal particle size distribution measuring apparatus (CAPA-700, manufactured by Horiba Seisakusho Co., Ltd.). As a result, the particles revealed to have an average secondary particle size of 0.30 μm. The yield of the particles was approximately 100%. The particles were dried and impurity analysis was performed. As a result, cerium amounted for 99.5% in terms of oxides of the total rare earth elements in the abrasive. Furthermore, powder X-ray diffraction measurement revealed that the obtained particles had characteristic peaks that coincided with the characteristic peaks of cerium(IV) oxide of cubic crystal form having a diffraction pattern with main peaks at diffraction angles 2θ=28.6°, 47.5° and 56.4° and described in ASTM Card No. 34-394. The specific surface area value of the cerium(IV) oxide particles by a gas adsorption method (BET method) was 25.8 $m^2$/g.

Example 2

A 100-liter stainless steel reactor was charged with the cerium(IV) oxide slurry of Example 1 washed by using a rotary filter press (manufactured by Kotobuki Giken Co., Ltd.) and an aqueous ammonium carbonate solution and the mixture was prepared so that the concentration of ammonium carbonate was 10 wt %, the concentration of $CeO_2$ was 15 wt %, and the amount of slurry was 100 kg. The temperature of slurry was elevated to 95° C. and at this temperature heat treatment was performed for 8 hours. After cooling, the slurry was washed by using a rotary filter press (manufactured by Kotobuki Giken Co., Ltd.) to obtain a slurry having an electric conductivity of 25 μS/cm and a $CeO_2$ concentration of 23 wt %. The slurry was dispersed in purified water and then the pH of the dispersion was adjusted to 5 with 10% nitric acid to prepare a slurry having a $CeO_2$ concentration of 5 wt %.

The obtained particles were measured for average secondary particle size by using a centrifugal particle size distribution measuring apparatus (CAPA-700, manufactured by Horiba Seisakusho Co., Ltd.). As a result, the particles revealed to have an average secondary particle size of 0.28 μm. The particles were dried and impurity analysis was performed. As a result, cerium amounted for 99.6% in terms of oxides of the total rare earth elements in the abrasive. Furthermore, powder X-ray diffraction measurement revealed that the obtained particles had characteristic peaks that coincided with the characteristic peaks of cerium(IV) oxide of cubic crystal form having a diffraction pattern with main peaks at diffraction angles 2θ=28.6°, 47.5° and 56.4° and described in ASTM Card No. 34-394. The specific surface area value of the cerium(IV) oxide particles by a gas adsorption method (BET method) was 25.5 m²/g.

Example 3

A 1-liter glass reactor was charged with 238 g of aqueous 20% ammonia solution corresponding to $NH_3/Ce^{3+}=6$ (molar ratio) and while keeping the liquid temperature at 30° C., 762 g of an aqueous cerium (III) nitrate solution containing cerium(III) nitrate in an amount of 99.0% in terms of purity of $CeO_2$ of the total rare earth oxides (containing 80 g in terms of $CeO_2$) was gradually added thereto to obtain a suspension of cerium (III) hydroxide. The temperature of the suspension was elevated to 80° C. over 1 hour. Thereafter, 2 l/minute of air was blown in through the glass nozzle and the oxidation reaction for converting cerium (III) to cerium (IV) was started. The oxidation reaction was completed in 5 hours. The liquid after the completion of the oxidation reaction was returned to room temperature to obtain a reaction mixture containing pale yellow fine particles at pH=5.5 having an electric conductivity of 127 mS/cm.

The reaction mixture was washed by water drive using an aspirator and the wet cake was redispersed in purified water to obtain a slurry having an electric conductivity of 94 μS/cm and a $CeO_2$ concentration of 25.5 wt %. The slurry was adjusted to pH 5 with 10% nitric acid to prepare a slurry having a $CeO_2$ concentration of 5 wt %.

Observation of the obtained particles on a transmission electron microscope revealed that a lot of small particles of 20 to 30 nm were found besides particles of 80 to 100 nm so that the particle size distribution was not uniform. Further, measurement of the particles for average secondary particle size by use of a centrifugal particle size distribution measuring apparatus (CAPA-700, manufactured by Horiba Seisakusho Co., Ltd.) indicated an average secondary particle size of 0.45 μm. The yield of the particles was approximately 100%. The particles were dried and impurity analysis was performed. As a result, cerium amounted for 99.5% in terms of oxides of the total rare earth elements in the abrasive. Furthermore, powder X-ray diffraction measurement revealed that the obtained particles had characteristic peaks that coincided with the characteristic peaks of cerium(IV) oxide of cubic crystal form described in ASTM Card No. 34-394. The specific surface area value of the cerium(IV) oxide particles by a gas adsorption method (BET method) was 25.0 m²/g.

Example 4

A 1-liter glass reactor was charged with 238 g of aqueous 20% ammonia solution corresponding to $NH_3/Ce^{3+}=6$ (molar ratio) and while keeping the liquid temperature at 50° C., 762 g of an aqueous cerium (III) nitrate solution containing cerous nitrate in an amount of 99.0% in terms of purity of $CeO_2$ of the total rare earth oxides (containing 80 g in terms of $CeO_2$) was gradually added thereto to obtain a suspension of cerium (III) hydroxide. The temperature of the suspension was elevated to 80° C. over 30 minutes. Thereafter, 2 l/minute of air was blown in through the glass nozzle and the oxidation reaction for converting cerium (III) to cerium (IV) was started. The oxidation reaction was completed in 5 hours. The liquid after the completion of the oxidation reaction was returned to room temperature to obtain a reaction mixture containing pale yellow fine particles at pH=6.1 having an electric conductivity of 127 mS/cm.

The reaction mixture was washed by water drive using an aspirator and the wet cake was redispersed in purified water to obtain a slurry having an electric conductivity of 42 μS/cm and a $CeO_2$ concentration of 23.4 wt %. The slurry was adjusted to pH 5 with 10% nitric acid to prepare a slurry having a $CeO_2$ concentration of 5 wt %.

Observation of the obtained particles on a transmission electron microscope revealed that a lot of small particles of 20 to 30 nm were found besides particles of 80 to 100 nm so that the particle size distribution was not uniform. Further, measurement of the particles for average secondary particle size by using a centrifugal particle size distribution measuring apparatus (CAPA-700, manufactured by Horiba Seisakusho Co., Ltd.) indicated an average secondary particle size of 0.47 μm. The yield of the particles was approximately 100%. The particles were dried and impurity analysis was performed. As a result, cerium amounted for 99.5% in terms of oxides of the total rare earth elements in the abrasive. Furthermore, powder X-ray diffraction measurement revealed that the obtained particles had characteristic peaks that coincided with the characteristic peaks of cerium(IV) oxide of cubic crystal form described in ASTM Card No. 34-394. The specific surface area value of the cerium(IV) oxide particles by a gas adsorption method (BET method) was 26.1 m²/g.

Comparative Example 1

Commercially available cerium oxide powder (average secondary particle size of 1.4 μm, a cerium oxide content of 57%, a specific surface area value by a gas adsorption method (BET method) of 3.0 m²/g) was dispersed in purified water to prepare a slurry having a $CeO_2$ concentration of 5 wt %.

[Polishing Test]

As the glass hard disk was used a 3.5-inch aluminosilicate reinforced glass substrate composed of 77.9 wt % of $SiO_2$ content, 17.3 wt % of $Al_2O_3$ content, and 4.8 wt % of $ZnO$ content. The substrate was subjected to primary polishing and had an average surface roughness of 7.3 Angstroms.

An artificial leather type polyurethane abrasive cloth (POLITEX DG (trademark), 38 mmφ, manufactured by Speedfam Co.) was applied to the platen of LAP MASTER LM-15 grinding machine (manufactured by LAP MASTER Co.) and polishing was performed pressing the surface to be polished of the substrate against the abrasive cloth under a load of 11 kPa.

The number of rotations of the press platen was 45 revolutions per minute and the amount of the abrasive slurry fed was 10 ml/minute. After the polishing, the product obtained was taken out, washed with purified water and then dried. From a decrease in weight the polishing speed was obtained. The average surface roughness (Ra) of the polished surface was measured by using New View 100 (manufactured by Zygo Co.).

Table 1 shows polishing speed, average surface roughness (Ra) and ratio of polishing speed to average surface roughness obtained.

TABLE 1

| Abrasive | Polishing Speed (nm/minute) | Average Surface Roughness (Angstrom) | Ratio (Polishing Speed/Average Surface Roughness · minute) |
|---|---|---|---|
| Example 1 | 40 | 2.8 | 142 |
| Example 2 | 53 | 3.0 | 176 |
| Example 3 | 32 | 2.7 | 119 |

TABLE 1-continued

| Abrasive | Polishing Speed (nm/minute) | Average Surface Roughness (Angstrom) | Ratio (Polishing Speed/Average Surface Roughness · minute) |
|---|---|---|---|
| Example 4 | 35 | 2.8 | 125 |
| Comparative Example 1 | 77 | 6.5 | 118 |

From Table 1, it can be seen that the abrasive compounds of Examples 1 and 2 in which average secondary particle size is 0.3 μm and cerium amounts for 99.5% and 99.6%, respectively, in terms of oxides of the total amount of rare earth elements in the abrasive have a smaller average surface roughness than the abrasive compound of Comparative Example 1 in which average secondary particle size is 1.4 μm and cerium amounts for 57%. In addition, the ratio of polishing speed to the average surface roughness is higher and the polishing properties are more excellent in the former than the latter.

The abrasive compounds of Examples 3 and 4 contain a lot of small particles of 20 to 30 nm in a mixed state so that they have a decreased polishing speed to some extent. However, they have good surface average roughness and are useful as a precision abrasive compound for an optical disk platter or a magnetic glass hard disk platter.

The cerium(IV) oxide particles obtained by the first and second production methods according to the present invention, in which oxygen or gas containing oxygen is blown into cerium hydroxide obtained by reacting a cerium salt with an alkaline substance have large specific surface areas value and contain a large amount of hydroxyl group per unit weight, so that they are suitable for chemical/mechanical polishing. That is, the abrasive compound of Comparative Example 1, which is a dispersion of the cerium oxide powder in water, has an effect of scratching a surface to be polished, whereas the abrasive compounds of Examples 1 to 4 obtained by the first and second production methods according to the present invention provide good polished surfaces having less unevenness due to chemical/mechanical-effects so that they are particularly suitable for uses that require precision polishing. The cerium(IV) oxide abrasive compounds obtained by these methods exhibit good polishing effects on glass and therefore they are suitable for a glass hard disk platter.

As described above, the abrasive compound for a glass substrate for an optical disk platter or a magnetic disk platter according to the present invention, in which a stable slurry of cerium(IV) oxide particles having an average secondary particle size of 0.1 to 0.5 μm dispersed in water, and further the above-mentioned abrasive compound in which cerium amounts for 95% or more in terms of oxides of the total amount of rare earth elements in the abrasive have small average surface roughness values and high ratio of the polishing speed to the average surface roughness, so that they have excellent polishing properties.

The abrasive compounds of the present invention containing cerium oxide particles having a smaller average secondary particle size make average surface roughness smaller, so that they can provide polished surfaces of a higher quality. Furthermore, in the abrasive compounds of the present invention, increased polishing speed and higher ratio of polishing speed to average surface roughness can be obtained by adjusting the abrasive compounds such that cerium amounts for 95% or more in terms of oxides of the total amount of rare earth elements in the abrasive used for polishing the glass hard disc platter. Therefore, improvement of productivity in the polishing step and reduction in cost are possible.

In particular, the abrasive compounds of the present invention are useful as finishing abrasive compounds since they can provide polished surfaces of a high quality when a glass substrate for an optical disk platter or a magnetic disk platter is polished therewith.

The abrasive compositions obtained by adding to the abrasive liquid of the present invention, a polishing promoter such as aluminum nitrate, iron nitrate or basic aluminum sulfamate are useful for polishing surfaces of plating layer such as Ni—P, of aluminum oxide layer, or of aluminum, of its alloys, or of alumite provided on aluminum disk platters that can be provided as industrial products.

What is claimed is:

1. A method for polishing a glass hard disk platter, comprising polishing a glass hard disk platter using a stable slurry in which cerium(IV) oxide particles having an average secondary particle size of 0.1 to 0.5 μm are dispersed in water, which contains $CeO_2$ in a concentration of 0.2 to 30 wt %, and contains a quaternary ammonium ion ($NR_4^+$, where R is an organic group) in a ($NR_4^+$)/($CeO^2$) molar ratio in a range of 0.001 to 1, wherein a proportion of cerium expressed as a ratio of (cerium oxide)/(cerium oxide + other rare earth oxides) in the cerium(IV) oxide particles is 95% or more based on weight, the stable slurry is a slurry of surface-modified cerium(IV) oxide obtained by heat-treating cerium(IV) oxide that is obtained by blowing oxygen or a gas containing oxygen into a suspension obtained by reacting a cerium (III) salt with an alkaline substance in a (OH)/($Ce^{3+}$) molar ratio of 3 to 30, in an aqueous medium in the presence of an ammonium salt having a non-oxidative anionic component selected from the group consisting of ammonium carbonate, ammonium hydrogen carbonate, and mixtures thereof, the stable slurry has a pH from 5 to 6, and an average surface roughness of the polished glass hard disk platter is from 2.7-3.0 angstrom.

2. The method according to claim 1, wherein a specific surface area of the cerium(IV) oxide particles is 2 to 200 $m^2$/g.

3. The method according to claim 1, wherein the cerium (III) salt and the alkaline substance are reacted under an inert gas atmosphere.

4. The method according to claim 1, wherein the cerium (III) salt and the alkaline substance are reacted at an atmospheric pressure.

* * * * *